United States Patent [19]
Wimmer

[11] Patent Number: 6,037,515
[45] Date of Patent: Mar. 14, 2000

[54] PROCESS FOR PRODUCING ETHYLENE FROM A HYDROCARBON FEEDSTOCK

[75] Inventor: Johann-Peter Wimmer, Munich, Germany

[73] Assignee: Linde Aktiengesellschaft, Germany

[21] Appl. No.: 09/061,091

[22] Filed: Apr. 16, 1998

[30] Foreign Application Priority Data

Apr. 17, 1997 [DE] Germany .......................... 197 16 092

[51] Int. Cl.[7] .............................. C07C 4/02; C10G 9/00
[52] U.S. Cl. ...................... 585/650; 585/648; 585/951; 208/106
[58] Field of Search .................. 585/650, 648, 585/951; 208/106

[56] References Cited

U.S. PATENT DOCUMENTS 2,573,341 10/1951 Kniel ....................................... 585/650
2,580,002 12/1951 Carrier .................................... 585/650
4,143,521 3/1979 Pano et al. ............................. 585/650

*Primary Examiner*—Glenn Caldarola
*Assistant Examiner*—In Suk Bullock
*Attorney, Agent, or Firm*—Millen, White, Zelano, & Branigan, P.C.

[57] ABSTRACT

The invention relates to a process for producing ethylene from a hydrocarbon feedstock, whereby the hydrocarbon feedstock is subjected to cracking. The crude gas thus produced undergoes quenching with water washing, crude gas compression, and crude gas drying and precooling. The gas is then sent to a separation section, wherein a C2/C3 separation of the precooled crude gas into a C2– stream and a C3+ stream is conducted. The C2– stream is sent through C2 hydrogenation, and the C3+ stream is separated into a C3 stream and a C4+ stream by means of a C3/C4 separation. According to the invention, when the process is started up, at times foreign ethylene and/or foreign C3 is fed to crude gas compression. In addition, a stream from C2 hydrogenation and a C3 stream from the C3/C4 separation are merged and recycled as a first recycle stream before crude gas compression.

15 Claims, 3 Drawing Sheets

PROCESS FOR PRODUCING ETHYLENE FROM A HYDROCARBON FEEDSTOCK

The invention relates to a process for producing ethylene from a hydrocarbon feedstock comprising subjecting a hydrocarbon feedstock to cracking, quenching the resultant crude gas with water, compressing the resultant quenched crude gas, subjecting the compressed crude gas to drying and precooling from where it is sent to a separation section. In the separation section, a C2/C3 separation of precooled crude gas is conducted to produce a C2− stream and a C3+ stream. The C2− stream is then sent through C2 hydrogenation, and the C3+ stream is separated into a C3 stream and a C4+ stream by a C3/C4 separation.

Cn (with n=2, 3, 4, or 5) here are hydrocarbons with n hydrocarbon atoms; Cn− or Cn+ are hydrocarbons with n or fewer or more hydrocarbon atoms, respectively.

Heretofore, the minimum amount of crude gas that was required for starting up an ethylene plant was produced by cracking the hydrocarbon feedstock. Until this minimum amount, approximately 60% of the plant load, was reached, this crude gas was flared off. In addition, the excess crude gas that was present after the start-up of crude gas compression and up until the separation section of the plant ran cold was also flared off, resulting in a smaller amount of gas that could be used as fuel gas for cracking. To reduce start-up costs, attempts were made to shorten the time lag from the initiation of start-up to the production of a product meeting specifications. To do this, different recycle lines were provided, and the plant output during start-up was reduced. However, this only limited the extent of flare activity somewhat.

SUMMARY OF THE INVENTION

One object of the invention is therefore to provide an environmentally friendly process for producing ethylene.

Upon further study of the specification and appended claims, further objects and advantages of this invention will become apparent to those skilled in the art.

These objects are achieved according to the invention by a process for producing ethylene from a hydrocarbon feedstock comprising subjecting the hydrocarbon feedstock to cracking; quenching the resultant crude gas with water; subjecting the resultant quenched crude gas to compression; subjecting the resultant compressed crude gas to drying and precooling; separating the resultant precooled crude gas into a C2− stream and a C3+ stream; subjecting the C2− stream to hydrogenation; and separating the C3+ stream into a C3 stream and a C4+ stream, the improvement comprising upon start-up of the process, at least one of foreign ethylene and foreign C3 is fed to the crude gas compression; in addition, a stream from the C2-hydrogenation and a C3 stream from the C3/C4 separation are merged and recycled as a first recycle stream before the crude gas compression.

Thus, a characteristic feature of the invention is that when the process is started up, at times foreign ethylene and/or foreign C3 are fed to crude gas compression; in addition, a stream from the C2 hydrogenation and a C3 stream from the C3/C4 separation are merged and recycled as a first recycle stream before the crude gas compression. (By "foreign" in the context of the invention is meant a fluid that is produced prior to a start-up of the process, e.g., piped in from outside the plant boundary.)

The feed of these foreign gases, optionally also higher hydrocarbons, makes it possible, together with the first recycle stream, to ensure early start-up of the separating section and subsequently the gradual admixing of crude gas without flare activity.

Naphtha, or another petroleum cut or component, or any mixture of petroleum components can be used as the hydrocarbon feedstock.

The foreign C3 that is fed during start-up can contain propane, propylene, or a mixture of the two.

Advantageously, the C4+ stream can be fed to a C4/C5 separation, in which a C4 product accumulates; in addition, a C5+ stream that at times accumulates during start-up together with a raw gasoline, which accumulates in the crude gas compression and is sent through a gasoline stabilization step, is admixed with the hydrocarbon feedstock.

Preferably, in a first phase of the start-up of the process the foreign ethylene is sent in gaseous form to the crude gas compression; a main process leg from the quenching on the low-pressure side of the crude gas compression is filled until crude gas drying and precooling, C2/C3-separation, C2-hydrogenation and a C1/C2 deep-cooling and separation on the high-pressure side of the crude gas compression with the foreign ethylene, and then compression take place, and a compression final pressure of between 20 and 30 bar is established.

In a second phase of start-up, preferably the quenching and C1/C2 deep-cooling and separation are separated from the main process leg, the stream is recycled from C2 hydrogenation into the first recycle stream before crude gas compression, foreign C3 is sent in gaseous form to the crude gas compression, fed to the crude gas precooling and drying (with refrigerants) and run cold, foreign C3 and a portion of C2 are condensed and sent in liquid form to C2/C3 separation, and a C2-free C3 is passed in liquid form to C3/C4 separation, is evaporated there to a C3 product stream, and fed together with the stream from C2 hydrogenation into a first recycle stream before crude gas compression.

In a third phase of start-up, preferably a first cracking furnace is loaded with hydrocarbon feedstock, and the crude gas that is produced is fed to the main process leg. As a result, C2− is also fed to C2/C3 separation and sent through C2 hydrogenation, and a portion of the hydrogenated gas is diverted as a fuel gas; in addition, from the C3/C4 separation a C3 product that does not meet specifications is sent to intermediate storage. A liquid C4 plus stream accumulates and is sent to C4/C5 separation, where a C4 product is made and a liquid C5 plus product is produced which is sent to the hydrocarbon feedstock in a second recycle stream together with a gasoline fraction that accumulates during compression and is subjected to stabilization. The feedstock for cracking is now increased until a more stable operation of the C2 hydrogenation is established.

In a fourth phase of start-up, as soon as the outlet stream from C2 hydrogenation meets specifications, the C2 minus stream is sent to deep-cooling which is fed with ethylene refrigerant, and the condensate from the deep-cooling is sent to C1/C2 separation, whose gaseous product is completely used in the cracking step as a fuel gas and whose liquid product, as soon as it contains no more methane, is sent to C2 separation, which meanwhile has run cold, where a ethylene product meeting specifications accumulates.

With dropping temperature in deep-cooling and C1/C2 separation and sufficient purity of the hydrogen stream from the deep-cooling and C1/C2 separation, methanization, C3-hydrogenation, C3-stripping, and C3-separation are carried out, and a propylene product is produced; in addition, gasoline hydrogenation and fractionation are carried out, and a gasoline product meeting specifications is produced. Therefore, the gasoline recycling in the second recycle stream to the hydrocarbon feedstock can accordingly be throttled and finally shut off.

BRIEF DESCRIPTION OF THE DRAWINGS

The invention is explained in more detail based on a preferred embodiment wherein:

FIG. 2 including

DETAILED DESCRIPTION OF THE FIGURES

Figure 1:
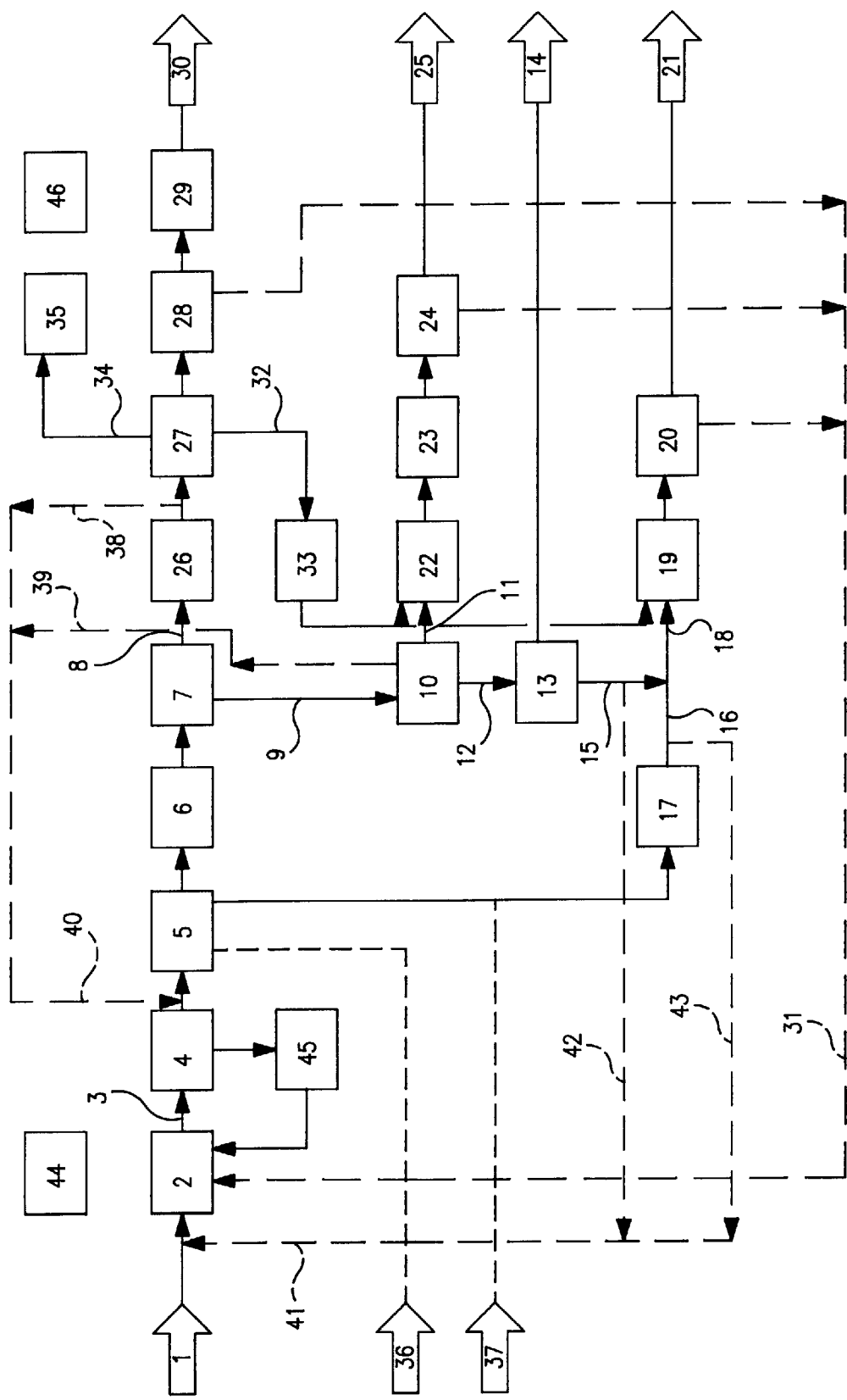
FIG. 1 is a block flowsheet of a process according to the invention for ethylene production.

In FIG. 1, a naphtha feedstock 1 is subjected to cracking step 2. Resultant crude gas is then quenched with water in scrubbing step 4, the quenched crude gas is then subjected to compression step 5, and the compressed gas is subjected to crude gas drying and precooling step 6. The resultant dried and precooled crude gas is then subjected to a C2/C3 separation step 7 so as to produce a C2– stream 8 and a C3+ stream 9; the latter C3+ stream 9 is further separated in a C3/C4 separation step 10 into a C3 stream 11 and a C4+ stream 12, and the resultant C4+ stream is subjected to a further C4/C5 separation 13 into a C4 product 14 and a C5+ stream 15. The resultant C5+ stream 15. The resultant C5+ stream 15, as a first gasoline stream, together with a second gasoline steam 16 which accumulates in the crude gas compression step 5 and is treated in a gasoline stabilization step 17, as a stream 18 is sent first to gasoline hydrogenation 19 and then to gasoline fractionation 20, in which a gasoline product 21 is obtained. The C3 stream 11 from C3/C4 separation 10 is sent through C3 hydrogenation 22, C3 stripping 23 and C3 separation 24. Thus, a propylene product 25 is obtained. To obtain ethylene, the C2– stream 8 is sent from C2/C3 separation 7 Through C2 hydrogenation 26, through deep-cooling and C1/C2 separation 27, through C2 separation 28, and through an ethylene circuit 29. Thus, an ethylene product 30 is obtained. Process streams that are not specified as products and that accumulate during the production of the pure products in C2 separation 28, C3 separation 24, and gasoline fractionation 20 are merged (stream 31) and used in cracking 2 to heat the cracking furnace. A hydrogen stream 32 from the deep-cooling of C1/C2 separation 27 is sent through methanization 33 and used for C3-hydrogenation 22 and for gasoline hydrogenation 19; other gases 34 that are not condensed during deep-cooling are fed to fuel-gas system 35.

For the start-up of the process according to the invention, a foreign ethylene supply 36, a foreign propylene supply 37, and a stream 38 from C2 hydrogenation 26 are important which, together with a stream 39 from C3/C4 separation 10, form a first recycle stream 40 before crude gas compression 5; in addition, a second recycle stream 41 is formed by the merging of a stream 42 from C4/C5 separation 13 and a stream 43 from gasoline stabilization.

As auxiliary systems, the process contains steam systems 44 and a process steam system 45, and to generate cold, it contains a propylene circuit 46.

Based on the embodiment of the process according to the invention that is explained with FIG. 1, a more detailed explanation is provided with the more completely schematized FIG. 2, whose step-wise start-up without flare activity is based on a representation of successive operational phases. Vertically lined blocks in the diagram of FIG. 2 are at operating pressure; cross hatched blocks are in operation.

A precondition for start-up is a supply of high-pressure steam, for example, from a plant network if high-pressure steam is required and is not available or is not yet available from the waste heat of cracking. As in a process according to the prior art, refrigeration circuits (propylene circuit 46, ethylene circuit with C2 separation 28), quenching-oil and quenching-water circuits of quenching and water washing 4 as well as the process steam system (45 in FIG. 1) are put into operation. Some cracking furnaces 2 are heated up to standby temperature with process steam. Individual phases of start-up follow.

Figure 2A:
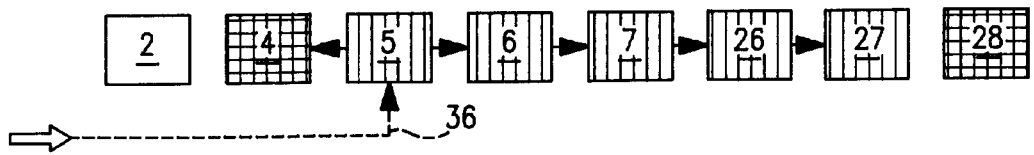
FIGS. 2A, 2B, 2C, 2D and 2E show step-wise the start-up of the process according to FIG. 1.

1st Start-up Phase (FIG. 2A)

Supplying of foreign ethylene 36 in gaseous form from the plant boundary to crude gas compression 5 and pressurization of front crude gas paths 4, 5 including quenching with water scrubbing 4 until precooling 6 begins at a pressure of about 1.5 bar of excess pressure.

Starting of crude gas compressor 5 with steady post-injection of foreign ethylene 36 and establishment of a compressor pressure of about 26 bar.

Pressurization of the pressure side of crude gas paths 6, 7, 26, 27 up to and including deep-cooling of C1/C2 separation 27 with ethylene to 26 bar.

If foreign ethylene 36 is made available at the plant boundary with corresponding pressure, the step of pressurizing the crude gas paths can also be carried out before the start-up of the compressor.

Figure 2B:
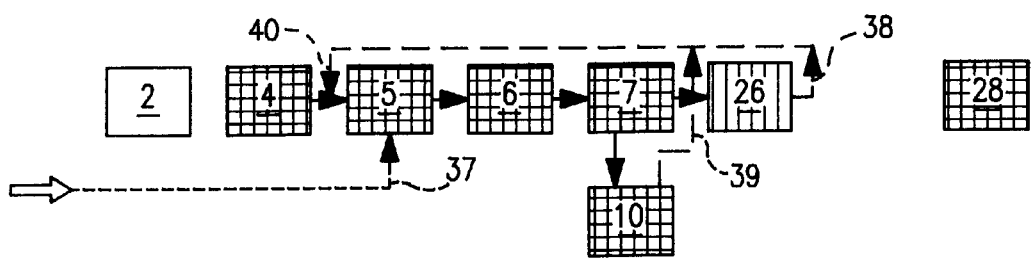

2nd Start-up Phase (FIG. 2B)

Disconnecting of deep-cooling of C1/C2 separation 27 and establishment of stream 38 from the outlet of C2 hydrogenation 26 via recycle stream 40 back to the low-pressure side of crude gas compression 5. The amount of recycling depends on the minimum amount of C2 hydrogenation 26 necessary.

The next step is the establishment of stream 39 via recycle stream 40 to the suction side of crude gas compression 5 and the cooling of precooling 6. To do this, gaseous foreign propylene 37 is supplied to crude gas compressor 5. Then, the individual cooling condensers in precooling 6 are subjected one after the other to refrigerants. Propylene and a portion of the ethylene are condensed and sent to C2/C3 separation 7.

C2/C3 separation 7 is put into operation and adjusted in such a way that in the column of this separation, the top is free of C3 and the bottom is free of C2.

C3 is sent in liquid form to C3/C4 separation 10, evaporated there, and recycled in gaseous form to stream 39 via recycle stream 40 to crude gas compression 5.

Thus, separation part 6, 7, 10 is in the recycle mode until deep-cooling and C1/C2 separation 27 and is ready to receive crude gas 3 from the furnace of cracking 2.

Figure 2C:
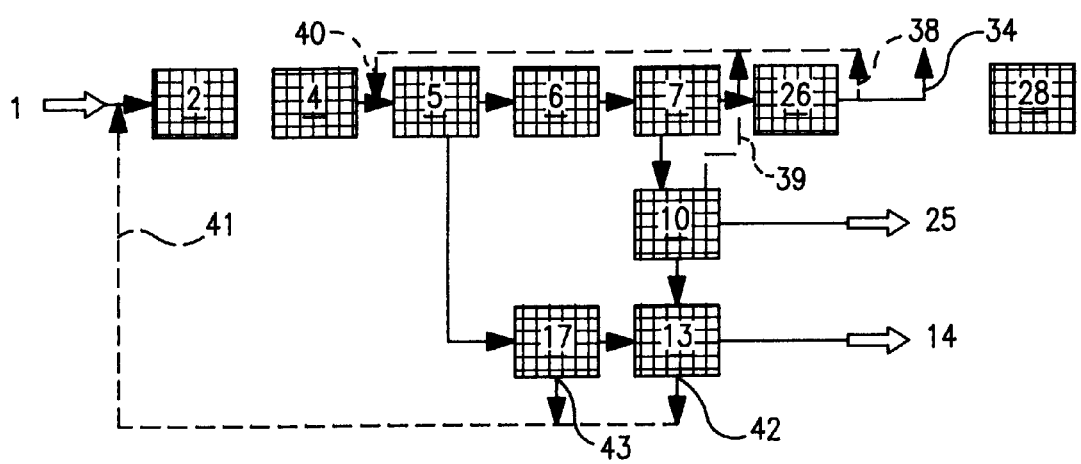

3rd Start-up Phase (FIG. 2C)

The first furnace of cracking 2 is loaded with naphtha feedstock.

The cracked gas (corresponds to crude gas 3 from cracking 2 in FIG. 1) passes through quenching with water washing 4 and compression 5 and is separated into corresponding fractions in precooling 6. The top gas of the column of C2/C3 separation 7 is free of C3 and is sent to C2 hydrogenation 26.

After C2 hydrogenation 26 in stream 34, the C2– product portion goes to the fuel gas system (35 in FIG. 1).

The bottom product of the column of C2/C3 separation 7 is separated in the C3/C4 column (C3/C4 separation 10), and the C3 in stream 39 is recycled partially to crude gas compression 5 through recycle stream 40. A C3 product portion (11 in FIG. 1) is subjected to intermediate storage in a C3 tank, not shown in FIG. 2, as a propylene product 25 that does not meet specifications. The C4+ fraction (C4+ stream 12 in FIG. 1) is fed to C4/C5 separation 13.

The bottom product of the column of C4/C5 separation 13 and the gasoline fraction from stabilization 17 are admixed with naphtha feedstock 1 of cracking 2 as streams 42 and 43. C4 is delivered as product 14.

The feedstock for cracking 2 is now increased until a more stable operation in C2 hydrogenation 26 is ensured.

Figure 2D:
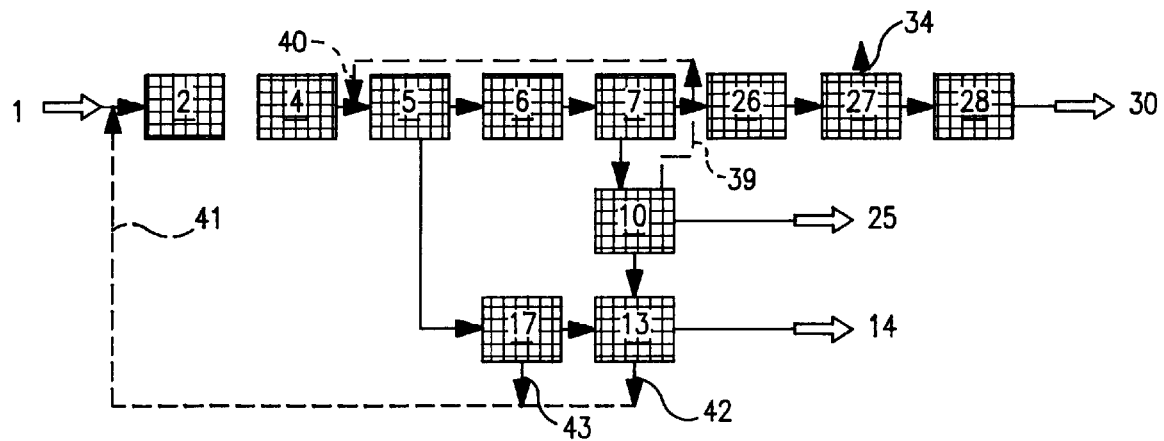

4th Start-up Phase (FIG. 2D)

As soon as the outlet stream from C2 hydrogenation 26 meets specifications, the latter is sent through as a C2– minus stream to deep cooling and C1/C2 separation 27, and the condensers in the deep-cooling are loaded with ethylene refrigerants.

The condensates of the deep-cooling go to C1/C2 separation 27. Gases 34 that are not condensed there are sent in stream 34 to the fuel gas system (35 in FIG. 1) and replace imported fuel gas there. As soon as the bottom product of the column of C1/C2 separation 27 meets specifications, it is put through to C2 separation 28. Since C2 separation 28 and the ethylene circuit (29 in FIG. 1) are already in operation, ethylene product 30 that meets specifications accumulates.

Figure 2E:
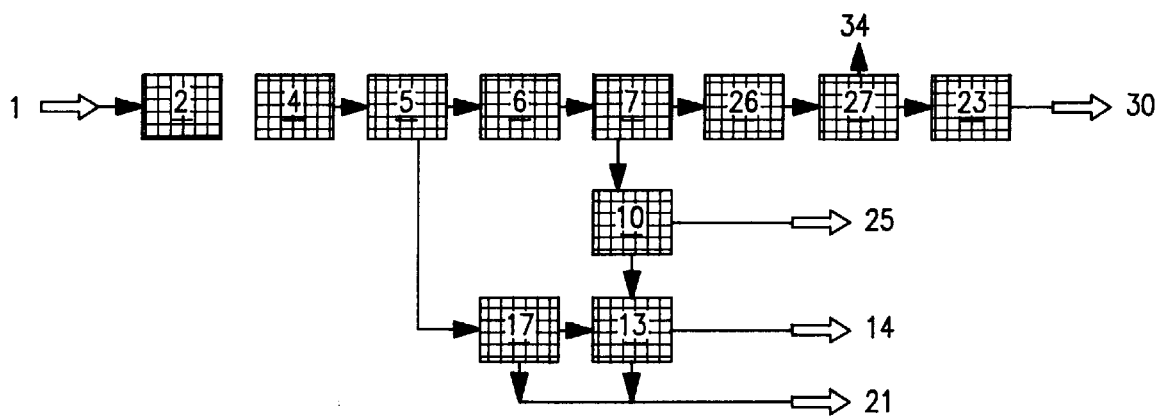

5th and Final Start-up Phase (FIG. 2E)

With dropping temperatures in deep-cooling and C1/C2 separation 27, the product purities of methane and hydrogen are enhanced.

As soon as hydrogen meeting specifications is available, the start-up of the methanization (33 in FIG. 1) and the C3 and gasoline path (22, 23, 24 and 19, 20 in FIG. 1) is carried out with their hydrogenations 22 and 19.

The recycling of the gasoline fraction in stream 42 and 43 to cracking 2 is established, and the load of the plant is increased as soon as C3 plus products 14, 21, 25 (C4, gasoline and propylene) are delivered in a manner that meets specifications.

When all of the individual steps of the start-up phases are carried out in a controlled manner, the entire start-up of plants is accomplished with the process according to the invention without any flare activity.

The preceding examples can be repeated with similar success by substituting the generically or specifically described reactants and/or operating conditions of this invention for those used in the preceding examples.

The entire disclosure of all application patents and publications, cited above and below, and of corresponding German application 19716092.1, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for producing ethylene from a hydrocarbon feedstock comprising:

(a) subjecting the hydrocarbon feedstock to cracking;

(b) quenching resultant crude gas with water;

(c) subjecting resultant quenched crude gas to compression;

(d) subjecting resultant compressed crude gas to drying and precooling;

(e) separating resultant precooled crude gas in a C2/C3 separation step into a C2– stream and a C3+ stream;

(f) subjecting said C2– stream to hydrogenation; and (g) separating said C3+ stream in a C3/C4 separation step into a C3 stream and a C4+ stream, the improvement comprising:

upon start-up of the process, feeding foreign ethylene, foreign C3, or both to the crude gas compression (c); and merging a stream from C2– hydrogenation (f) and a C3 stream from the C3/C4 separation (g), and recycling the merged stream as a first recycle stream before the crude gas compression (c).

2. A process according to claim 1, wherein the foreign C3 contains propane, propylene, or a mixture of the two.

3. A process according to claim 1, further comprising feeding the C4+ stream from (g) to a C4/C5 separation (h), in which a C4 product accumulates, and sending a C5+ stream, which accumulates during start-up, together with a raw gasoline, which accumulates in crude gas compression (c), through gasoline stabilization, and then admixing the resultant stream with said hydrocarbon feedstock.

4. A process according to claim 1, further comprising sending foreign ethylene, in a first phase of the start-up of the process, in gaseous form to crude gas compression (c);

filling with foreign ethylene a main process leg from quenching (b) on the lower pressure side of crude gas compression (c) to crude gas drying and precooling (d) $C_2/-C_3+$ separation (e), C2-hydrogenation (f), and a C1/C2 deep-cooling and separation on the high-pressure side of crude gas compression (c), then carrying out compression, and establishing a compression final pressure of 20–30 bar.

5. A process according to claim 4, further comprising:

in a second phase of start-up, separating the quenching (b) and C1/C2 deep-cooling and separation (h) from sad main process leg, recycling a stream from C2 hydrogenation (f) is recycled into said first recycle stream before crude gas compression (c), supplying foreign C3 in gaseous form to crude gas compression (c), and feeding foreign C3 to crude gas precooling and drying (d) with refrigerants, condensing foreign C3 and a portion of C2 and sending the condensate in liquid form to C2/C3 separation (e), and sending a C2-free C3 stream in liquid form to C3/C4 separation (g), wherein the C2-free C3 stream is evaporated into a C3 product stream, and fed together with said stream discharged from C2 hydrogenation (f) into said first recycle stream before crude gas compression (c).

6. A process according to claim 5, further comprising:

in a third phrase of start-up, feeding hydrocarbon crude gas from cracking (a) to said main process leg, delivering C2– to C2/C3 separation (e) and through C2 hydrogenation (f), and diverting a portion of hydrogenated gas for use as fuel gas, subjecting a C3 product, not meeting specifications, from C3/C4 separation (g) to intermediate storage, sending a liquid C4+ stream which accumulates to a C4/C5 separation, where a C4 product is made and a liquid C5+ product is produced, and sending said liquid C5+ product, together with a gasoline fraction that accumulates during compression (c), to said hydrocarbon feedstock in a second recycle steam, and increasing feedstock to cracking (a) to provide a C2 hydrogenation operation of increased stability.

7. A process according to claim 6, further comprising:

in a fourth phase of start-up, as soon as the outlet stream from C2 hydrogenation (f) meets specifications, sending the C2– stream to a deep-cooling system provided with ethylene refrigerant, sending condensate from said deep-cooling to C1/C2 separation, and using the gaseous product from said C1/C2 separation is used as a fuel gas in cracking (a), and sending liquid product, freed of methane, to C2 separation, where an ethylene product meeting specifications accumulates.

8. A process according to claim 7, further comprising:

in a final phase of start-up, producing a hydrogen stream of sufficient purity from the deep-cooling and C1/C2 separation, putting into operation methanization, C3-hydrogenation, C3-stripping and C3-separation are producing a propylene product, carrying out gasoline hydrogenation and fractionation and producing a gasoline product meeting specifications, and throttling the recycling of gasoline in the second recycle stream to the hydrocarbon feedstock and finally shutting down the recycle.

9. A process according to claim 8, wherein the foreign C3 contains propane, propylene, or a mixture of the two.

10. A process according to claim 3, wherein sending foreign ethylene, in a first phase of the start-up of the process, in gaseous form to crude gas compression (c);

filling with foreign ethylene a main process leg from quenching (b) on the lower pressure side of crude gas compression (c) to crude gas drying and precooling (d) $C_2/-C_3$ + separation (e), C2-hydrogenation (f), and a C1/C2 deep-cooling and separation on the high-pressure side of crude gas compression (c), then carrying out compression, and establishing a compression final pressure of 20–30 bar.

11. A process according to claim 10, further comprising:

in a second phase of start-up, separating the quenching (b) and C1/C2 deep-cooling and separation (h) from said main process leg, recycling a stream from C2 hydrogenation (f) is recycled into said first recycle stream before crude gas compression (c), supplying foreign C3 in gaseous form to crude gas compression (c), and feeding foreign C3 to crude gas precooling and drying (d) with refrigerants, condensing foreign C3 and a portion of C2 and sending the condensate in liquid form to C2/C3 separation (e), and sending a C2-free C3 stream in liquid form to C3/C4 separation (g), wherein the C2-free C3 stream is evaporated into a C3 product stream, and fed together with said stream discharged from C2 hydrogenation (f) into said first recycle stream before crude gas compression (c).

12. A process according to claim 11, further comprising:

in a third phrase of start-up, feeding hydrocarbon crude gas from cracking (a) to said main process leg, delivering C2– to C2/C3 separation (e) and through C2 hydrogenation (f), and diverting a portion of hydrogenated gas for use as fuel gas, subjecting a C3 product, not meeting specifications, from C3/C4 separation (g) to intermediate storage, sending a liquid C4+ stream which accumulates to a C4/C5 separation, where a C4 product is made and a liquid C5+ product is produced, and sending said liquid C5+ product, together with a gasoline fraction that accumulates during compression (c), to said hydrocarbon feedstock in a second recycle stream, and increasing feedstock to cracking (a) to provide a C2 hydrogenation operation of increased stability.

13. A process according to claim 12, further comprising:

in a fourth phase of start-up, as soon as the outlet stream from C2 hydrogenation (f) meets specifications, sending the C2– stream to a deep-cooling system provided with ethylene refrigerant, sending condensate from said deep-cooling to C1/C2 separation, and using the gaseous product from said C1/C2 separation is used as a fuel gas in cracking (a), and sending liquid product, freed of methane, to C2 separation, where an ethylene product meeting specifications accumulates.

14. A process according to claim 13, further comprising:

in a final phase of start-up, producing a hydrogen stream of sufficient purity from the deep-cooling and C1/C2 separation, putting into operation methanization, C3-hydrogenation, C3-stripping and C3-separation are producing a propylene product, carying out gasoline hydrogenation and fractionation and producing a gasoline product meeting specifications, and throttling the recycling of gasoline in the second recycle stream to the hydrocarbon feedstock and finally shutting down the recycle.

15. A process according to claim 14, wherein the foreign C3 contains propane, propylene, or a mixture of the two.

* * * * *